(12) United States Patent
Esbensen et al.

(10) Patent No.: US 8,979,492 B2
(45) Date of Patent: Mar. 17, 2015

(54) METHODS AND SYSTEMS FOR DETERMINING A PITCH ANGLE OFFSET SIGNAL AND FOR CONTROLLING A ROTOR FREQUENCY OF A ROTOR OF A WIND TURBINE FOR SPEED AVOIDANCE CONTROL

(75) Inventors: Thomas Esbensen, Herning (DK); Gustav Hoegh, Herning (DK)

(73) Assignee: Siemens Aktiengesellschaft, München (DE)

( * ) Notice: Subject to any disclaimer, the term of this patent is extended or adjusted under 35 U.S.C. 154(b) by 556 days.

(21) Appl. No.: 13/353,584

(22) Filed: Jan. 19, 2012

(65) Prior Publication Data

US 2012/0189443 A1 Jul. 26, 2012

(30) Foreign Application Priority Data

Jan. 24, 2011 (EP) ..................................... 11151812

(51) Int. Cl.
*F03D 7/00* (2006.01)
*F03D 7/02* (2006.01)

(52) U.S. Cl.
CPC ................ *F03D 7/00* (2013.01); *F03D 7/0224* (2013.01); *F03D 7/026* (2013.01); *F05B 2260/96* (2013.01); *F05B 2270/101* (2013.01); *F05B 2270/102* (2013.01); *F05B 2270/1095* (2013.01); *Y02E 10/723* (2013.01)
USPC ......... 416/1; 416/35; 416/37; 416/41; 416/61

(58) Field of Classification Search
CPC ....... F03D 7/026; F03D 7/022; F03D 7/0224; F03D 7/0276; F03D 7/0296; F05D 2260/96; F05D 2270/334; Y02E 10/723; Y02E 10/766; F05B 2270/101; F05B 2270/1011; F05B 2270/1012; F05B 2270/1014; F05B 2270/1016; F05B 2270/1021; F05B 2270/3201; F05B 2270/327; F05B 2270/328
USPC ............ 416/1, 35–38, 41, 43, 61; 290/43, 44, 290/54, 55; 322/29, 31, 32
See application file for complete search history.

(56) References Cited

U.S. PATENT DOCUMENTS

| | | | | |
|---|---|---|---|---|
| 4,193,005 | A | * | 3/1980 | Kos et al. .......................... 290/44 |
| 4,700,081 | A | | 10/1987 | Kos et al. |
| 8,053,917 | B2 | * | 11/2011 | Wakasa et al. ................... 290/44 |
| 2008/0260514 | A1 | | 10/2008 | Nielsen et al. |
| 2009/0292397 | A1 | | 11/2009 | Bjerge et al. |

FOREIGN PATENT DOCUMENTS

| | | |
|---|---|---|
| CN | 101586527 A | 11/2009 |
| DE | 102004054608 A1 | 3/2006 |
| EP | 2123906 A1 | 11/2009 |
| GB | 2117933 A | 10/1983 |
| WO | WO 2008081232 A1 | 7/2008 |

* cited by examiner

*Primary Examiner* — Edward Look
*Assistant Examiner* — Danielle M Christensen

(57) ABSTRACT

A method for determining and applying a pitch angle offset signal for controlling a rotor frequency of a rotor of a wind turbine is disclosed. The method includes obtaining a motion quantity indicative of a motion of the rotor and determining the pitch angle offset signal based on the motion quantity such that the pitch angle offset signal is adapted to be used for adjusting a blade pitch angle of a rotor blade mounted at the rotor for controlling the rotor frequency in order to reduce a time span during which the rotor is in a critical motion region. A corresponding system and a method for controlling a rotor frequency are also disclosed.

12 Claims, 4 Drawing Sheets

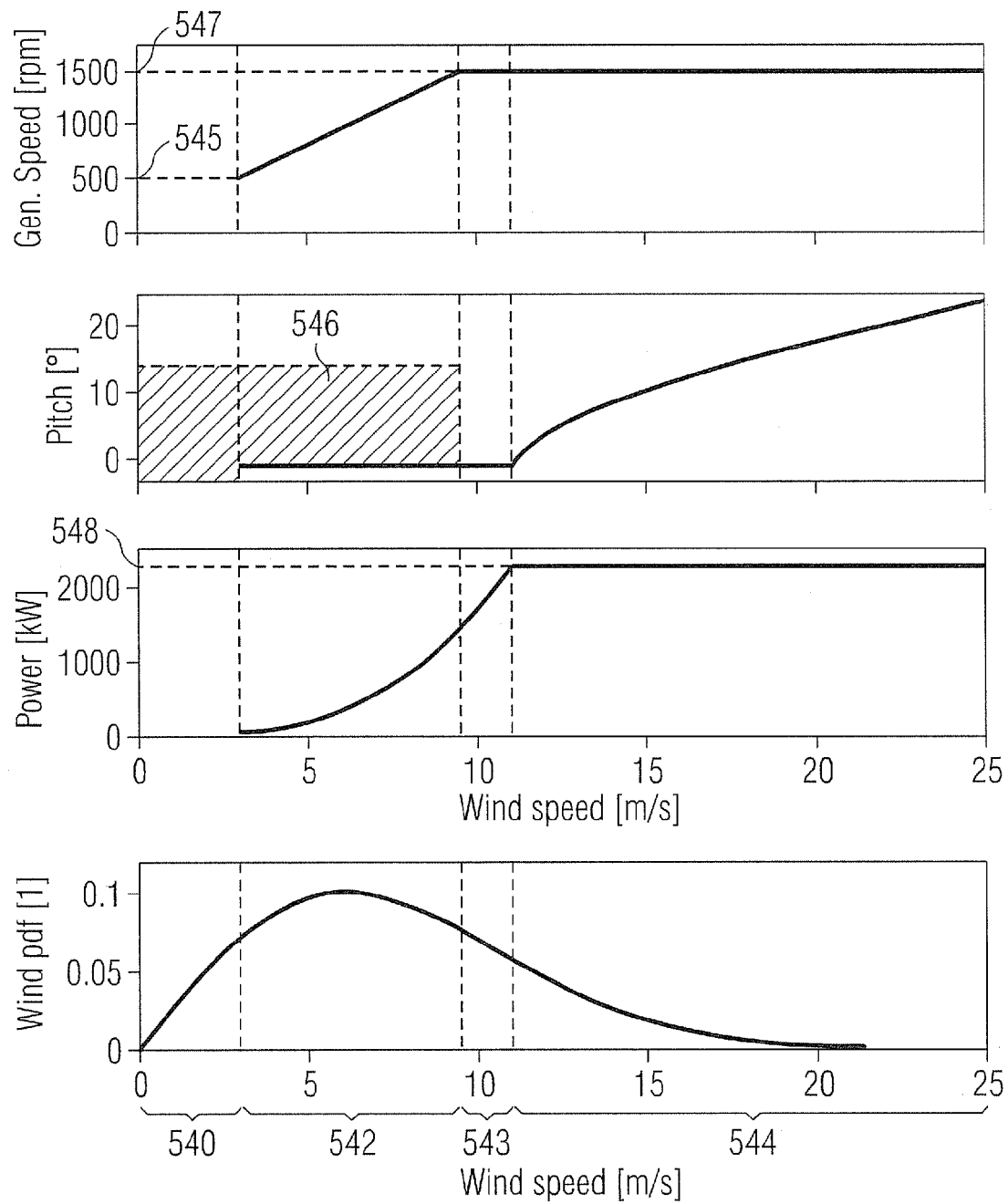

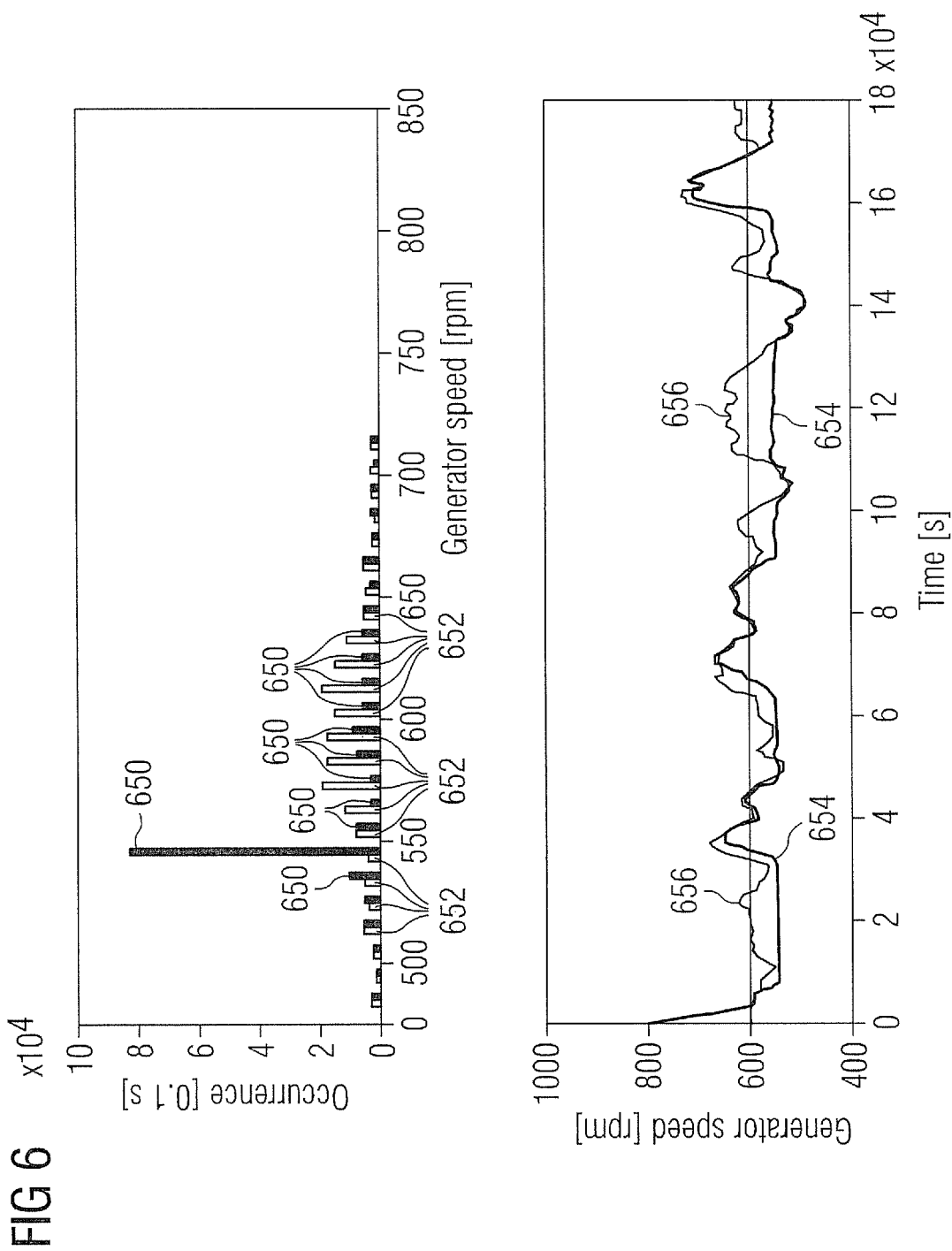

METHODS AND SYSTEMS FOR DETERMINING A PITCH ANGLE OFFSET SIGNAL AND FOR CONTROLLING A ROTOR FREQUENCY OF A ROTOR OF A WIND TURBINE FOR SPEED AVOIDANCE CONTROL

CROSS REFERENCE TO RELATED APPLICATIONS

This application claims priority of European Patent Office application No. 1151812.2 EP filed Jan. 24, 2011. All of the applications are incorporated by reference herein in their entirety.

FIELD OF INVENTION

The present invention relates to a method and to a system for determining a pitch angle offset signal for controlling a rotor frequency of a rotor of a wind turbine and to a method for controlling a rotor frequency of a rotor of a wind turbine. In particular, the present invention relates to a method and to a system for determining a pitch angle offset signal for controlling a rotor frequency of a rotor of a wind turbine, to avoid that the rotor frequency or a harmonic of the rotor frequency coincides with a resonance frequency of an oscillation mode of the turbine.

ART BACKGROUND

U.S. Pat. No. 4,700,081 discloses a speed avoidance logic for a variable speed wind turbine, wherein the generator torque (or generator power) is controlled in a manner which maneuvers the rotor tip speed with respect to the wind speed. In particular, a torque command signal (or power reference) is provided to the converter for controlling the power flow to the power grid and hence for controlling the air gap torque in the AC generator for controlling the generator torque.

US 2009/0292397 A1 discloses a method and an apparatus for damping tower oscillation in a wind turbine, wherein the rotor rotational speed is controlled such that a critical rotor speed is avoided. In particular, the power reference is increased such that the power reference and the rotor speed both follow the optimum curve again at the point where the rotational speed is leaving the critical window.

It has however been observed that the conventional method for controlling a rotor frequency may not be accurate enough, may not work in certain conditions, or may even not be possible (in particular during low wind conditions, or during curtailment).

There may be a need for a method and a system for determining a pitch angle offset signal for controlling a rotor frequency of a rotor of a wind turbine and for a method for controlling a rotor frequency of a rotor of a wind turbine, wherein at least some of the above-mentioned problems have been overcome. In particular, there may be a need for a method and a system for determining a pitch angle offset signal and for a method for controlling a rotor frequency of a rotor of a wind turbine, wherein a problems regarding a coincidence of a resonance frequency of an oscillation mode of the wind turbine and a rotor frequency or a harmonic of the rotor frequency are reduced.

SUMMARY OF THE INVENTION

This need may be met by the subject matter according to the independent claims. Advantageous embodiments of the present invention are described by the dependent claims.

Methods and systems for speed avoidance control for a variable-speed wind turbine are provided, wherein the methods and systems use a pitch angle offset signal for controlling the rotor frequency of a wind turbine.

According to an embodiment a method for determining a pitch angle offset signal (in particular a signal representing a pitch angle offset, in particular a signal which together with a default pitch angle signal allows a computation of a total pitch angle signal being in particular a sum of the pitch angle offset signal and the default pitch angle signal) for controlling (in particular regulating, adapting, impacting, and/or adjusting) a rotor frequency (as for example measured in revolutions per minute (RPM), in an angular velocity, the rotor frequency representing or being indicative of a rotor speed, a generator speed, or a generator frequency, wherein the generator is mechanically coupled to the rotor, wherein between the rotor and the generator a gear may be provided or wherein, as in a direct-drive turbine, between the rotor and the generator no gear is provided) of a rotor (comprising a rotation shaft at which one or more rotor blades are mounted such that they extend in a rotor plane perpendicular to the rotational shaft of the rotor) of a wind turbine (in particular comprising a wind turbine tower, a nacelle mounted at the top of the tower, a rotor rotatably supported within the nacelle and a generator mechanically coupled to the rotor shaft for generating electric energy upon rotation of the rotor or (generator) shaft) is provided, wherein the method comprises obtaining (in particular comprising measuring the motion quantity, transforming the measured motion quantity into an electric signal representing the motion quantity and/or transferring receiving or transferring an electric signal representing the motion quantity) a motion quantity (such as a rotational speed or a rotational frequency of the rotor or of the generator coupled to the rotor) indicative of a motion (in particular a rotation, in particular indicative of a rotational speed or rotational frequency) of the rotor (or the generator mechanically coupled to the rotor or any other component mechanically coupled to the rotor); determining (in particular comprising deriving, computing, obtaining by processing the motion quantity, computing by using a computer program, wherein the determining may in particular comprise generating the pitch angle offset signal, e.g. in the form as an electric signal) the pitch angle offset signal (in particular an electric signal representing a desired pitch angle offset relative to a standard or default pitch angle of a rotor blade mounted at the rotor) based on the motion quantity (such that the pitch angle offset signal depends on the motion quantity, in particular on a rotor frequency or a generator frequency) such that the pitch angle offset signal is adapted (in particular being suitable or appropriate, in particular computed) to be used for adjusting (in particular changing) a blade pitch angle (or blade pitch angle or blade pitch angles, wherein there might be several blades (e.g. three blades) mounted at the rotor, wherein a collective (identical) pitch angle offset may be applied to all blades, but there could be an individual pitching of the blades) the blade pitch angle being indicative of a rotational amount the rotor blade is adjusted or rotated in relation to the rotation plane of the rotor, wherein a blade pitch angle is defined as the angle between the plane of rotation and the blade cross-section chord, wherein different blade pitch angles represent different orientations of the blade rotated around a longitudinal axis of the blade, wherein in particular the blade pitch angle may be defined as the angle between the plane of rotation and the chord of the blade profile, the chord being the straight line connecting the leading and trailing edges of the blade cross-section (airfoil)) of a rotor blade mounted at the rotor (in particular such that the longitudinal axis of the blade is perpendicular to the rotation shaft) for controlling (in particular comprising regulating, impacting, adjusting or adapting) the rotor frequency (or generator frequency or rotor speed or generator speed) in order to reduce a time span (in particular a range in time or a sum of a number of time ranges) during which the rotor is in a critical motion region (in particular in which the rotor or the generator may excite a vibrational mode of the turbine, in particular the turbine tower, in particular, when the frequency of the rotor or the rotor frequency or the generator frequency matches a resonance frequency of a turbine vibration mode).

In particular, a wind turbine tower may start oscillating at a critical resonance frequency, if the tower frequency and the rotor frequency or a harmonic (a multiple of the) rotor frequency coincide. In particular, an excitation of the turbine oscillation may occur, if the resonance oscillation frequency of the turbine (or the turbine tower) matches the rotor (or generator) frequency or two times the rotor (or generator) frequency or three times the rotor (or generator) frequency, or four times the rotor (or generator) frequency or five times to ten times the rotor (or generator) frequency. The critical frequencies are in particular mostly 1× or 3× (or 1× 2× 3× and their harmonics) of the rotor frequency. These excitations of the oscillation of the turbine may cause mechanical stress to components of the wind turbine and are avoided according to an embodiment of the invention.

Conventionally, the problem has been solved by providing a mechanical construction which is strong enough to tolerate the increased vibration and increased loading. However, this may be costly and inefficient. Furthermore, a so-called resonance speed avoider (RSA) function has been implemented which ensures that the rotor speed is kept away from the critical speed. Thereby, the generator torque or the generator power is controlled in a way that will keep the generator speed (or rotor speed) away from the critical speed.

Problems with the conventional approaches in particular occur, if the power converter is cut-out or the turbine is controlled only to deliver a small and limited power output (due to low wind speed operation, complying with immediate wind farm power requirements, low noise requirements etc.). In these cases the generator torque or the generator power may not be utilized to achieve a resonance speed avoidance control. These limitations are at least partly overcome according to an embodiment.

According to an embodiment the motion quantity is indicative of a rotational frequency (or rotational speed such as measured in rounds per minute (RPM)) of the rotor (or the generator which may rotate one times (for direct-drive turbines), or multiple times (for geared turbines), such as between 10 times and 200 times, in particular between 90 times and 120 times, faster than the rotor) and wherein the critical motion region is a critical range (ranging in particular from a first rotational frequency to a second rotational frequency larger than the first rotational frequency) of the rotational frequency (or rotational speed) of the rotor (or the generator). In other embodiments the motion quantity is indicative of a quantity which is related or which can be computed from the rotational frequency of the rotor. In particular, the motion quantity may be indicative of a rotational frequency (or rotational speed) of the generator (or rotor) which may be measured in a simple manner. Thereby, obtaining the motion quantity may be simplified.

According to an embodiment, the critical range is a range around a predetermined (or estimated, i.e. online computed) critical rotational frequency (or rotational speed) of the rotor (or the generator). In particular, it is intended to avoid coinciding the tower frequency and the rotor frequency (rotor speed), the tower frequency may be known by a parameter (predetermined value) but may also be estimated/computed online based on the observed tower movement, hence, it might be a predetermined or an estimated value. In particular, the critical range may range from the predetermined or estimated critical rotational frequency diminished by a particular frequency amount to the predetermined critical rotational frequency augmented by the particular frequency amount. In particular, the critical rotational frequency may be known or may be calculated or estimated using a model of the turbine or an estimator, in particular a mechanical model or structural model and/or on measurements of the turbine tower. In particular, the critical rotational frequency may be a fixed critical rotational frequency which may not change during performing the method for determining a pitch angle offset signal.

According to an embodiment, the predetermined critical rotational frequency comprises a frequency equal (or at least approximately equal) to a fraction or to a integer multiple of a resonance oscillation frequency (such as ⅓ or 3, thereof) of an oscillation mode (an oscillation or a vibration of the whole turbine or at least a portion of the turbine) of the turbine, in particular of a tower of the turbine (wherein in particular the masses or turbine components connected to the tower are taken into account). Thus, the critical rotational frequency may be derivable from a mechanical oscillation analysis of the turbine, in particular of the tower of the turbine.

According to an embodiment, the pitch angle offset signal is generated such that the adjusted rotor blade pitch angle (or the actual pitch angle offset signal itself) is greater for a motion quantity indicative of a rotational frequency lower than the predetermined critical rotational frequency than for a motion quantity indicative of a rotational frequency greater than the predetermined critical rotational frequency. In particular, the rotor blade may be adjusted using the pitch angle offset signal such that when the rotor rotates with a frequency lower than the predetermined critical rotational frequency the rotor blade pitch angle is equal to a first rotor blade pitch angle and when the rotor rotates with a frequency greater than the predetermined critical rotational frequency the rotor blade pitch angle is equal to a second rotor blade pitch angle, wherein the first rotor blade pitch angle is greater than the second rotor blade pitch angle. In particular, while the rotational frequency of the rotor increases from a value lower than the predetermined critical rotational frequency to a value greater than the predetermined critical rotational frequency the adjusted rotor blade pitch angle decreases, to thus facilitate acceleration of the rotor to quickly ride through the critical rotational frequency (reducing the time interval of the rotor or of the generator having the critical rotational frequency). Thereby, damages to components of the wind turbine may be reduced.

According to an embodiment, the pitch angle offset signal is generated such that the adjusted rotor blade pitch angle (or the pitch angle offset signal itself) is greater than zero degrees in the critical motion region (such as generally diminishing an acceleration of the rotor) and decreases (thus facilitating acceleration of the rotor), in particular having a negative slope ($-\Delta y/\Delta x$) (being a derivative of the pitch angle offset signal or a derivative of the adjusted rotor blade pitch angle with respect to a rotational frequency or a rotational speed of the rotor or the generator), in at least a portion (or in the entire critical motion region) of the critical motion region, along increasing rotational frequency of the rotor (or generator) (in particular, the course of the pitch angle offset signal or the course of the adjusted rotor blade pitch angle with respect to the rotational frequency of the rotor may comprise one or more linear sections or may comprise a curve having varying curvature). In particular the pitch angle offset signal is generated such that the adjusted blade pitch angle (or the pitch angle offset signal itself) has a negative slope at the predetermined critical rotational frequency. Having a negative slope at the predetermined critical rotational frequency may cause an acceleration of the rotor such as to quickly ride through the critical predetermined critical rotational frequency. This may apply for some conditions such as increasing wind speeds, wherein the speed will quickly ride through (accelerate through) the critical region. However, for other cases (decreasing wind speeds) the speed may quickly ride through (decelerate through) the critical region. Thereby, damages at components of the turbine may be reduced. Thus, lifetime of the turbine may be increased.

According to an embodiment, the determining the pitch angle offset signal comprises relating (in particular comprising comparing, forming a difference or processing) the motion quantity to the critical motion region. In particular, a deviation of the rotational frequency of the rotor from the critical rotational frequency may be calculated. In particular, the determining the pitch angle offset signal may be based on the computed deviation. Determining the pitch angle offset signal may be based on the motion quantity and on the critical motion region.

In particular, at a rotational frequency of the rotor or the generator far below the critical rotational frequency the pitch angle offset signal may be generated such that the adjusted rotor blade pitch angle is ramped up from zero to a particular maximal pitch angle, such as between 4° and 10°, to denote non-limiting examples, in particular around 7°. In particular, the pitch angle offset signal may then be generated along increasing rotational frequency of the generator to gradually decrease from the maximal value to an intermediate value, such as between 3° and 7°, in particular between 4° and 5°, at the predetermined critical rotational frequency and may then decrease for a rotational frequency above the critical rotational frequency from this intermediate value to zero far above the critical rotational frequency, such as around 50 RPM greater than the critical rotational frequency of the generator. In particular, a shape of the course of the pitch angle offset signal or the course of the adjusted rotor blade pitch angle may depend on the design of the blade, an air density, and other operational parameters.

According to an embodiment, the method further comprises determining the pitch angle offset signal (and also in particular generating the pitch angle offset signal) while the motion quantity is indicative of a rotation of the rotor below a nominal rotor frequency. Thereby, the nominal rotor frequency may also be referred to as a rated rotor frequency or a (on average) maximal rotor frequency denoting a rotor frequency the rotor is designed or constructed to rotate in a normal operational state. The control system of the wind turbine may (for high wind speeds) try to maintain the rotor speed at the nominal speed, but the nominal speed will in fact be exceeded shortly, since the system may have (small) errors compared to the desired set point of the nominal speed. In particular, the nominal speed or frequency of the rotor may be a speed of the rotor selected such that the rotor (and/or the mechanical components supporting the rotor) last for about (or at least) 20 years and/or such that the acoustic noise emissions meet certain specifications, when the rotor is operated at (or below) the nominal speed.

In particular, the nominal rotor frequency may be a frequency which must not be exceeded for an extended time period on average during continuous operation to avoid mechanical damage to the rotor, to the generator, to the tower, or to other parts of the wind turbine. In particular, during normal operation conditions the turbine is supposed to rotate the rotor with the nominal rotor frequency and is further supposed to provide a nominal electric power to a utility grid. In particular, the nominal rotor frequency may be related to a nominal generator speed which may amount to for example between 1000 RPM and 1600 RPM, according to an exemplary embodiment.

According to an embodiment, the method further comprises determining (and also in particular generating) the pitch angle offset signal while the motion quantity is indicative of a rotation of the rotor below a predetermined threshold rotor frequency lower than the nominal rotor frequency, wherein below the threshold rotor frequency the turbine is supposed to supply zero electric energy or electric power to the utility grid coupled to the wind turbine.

In particular, while the rotor is rotating with a frequency below the predetermined threshold rotor frequency there may be no conversion of mechanical energy provided by the rotating rotor to electric energy, since the generator and/or the converter coupled to the generator are disabled. In particular, in this situation of disabled generator and/or converter it is not possible to use a generator torque to control the rotational frequency of the rotor. Thus, in particular in this operational state, where no electric energy is produced by the turbine, the rotational speed of the rotor may advantageously be controlled by adjusting the pitch angle taking into account the determined pitch angle offset signal.

According to an embodiment, the determining the pitch angle offset signal is further based on one or more operational parameters (such as depending on a mode of the turbine, such as a safe-mode, low-noise mode, a start-up-mode or some other modes), in particular a wind speed, an air density (of the air in the wind) and/or an acceleration signal of the rotor and/or the generator. Taking these additional operational parameters into account may further improve the method of determining a pitch angle offset signal for in particular improving the method for controlling a rotor frequency of the rotor.

According to an embodiment, a method for controlling a rotor frequency of a rotor of a wind turbine is provided, wherein the method comprises determining (and in particular also generating) a pitch angle offset signal according to one of the aforementioned embodiments; and adjusting (in particular changing, mechanically turning or adapting) the pitch angle (the blade pitch angle being defined as the angle between the plane of rotation and the blade cross-section chord or a plane defined by the chord of the blade, the chord being the straight line connecting the leading and trailing edges of the blade cross-section (airfoil)) of the rotor blade (or one or more further rotor blades) mounted at the rotor based on the pitch angle offset signal. In particular, the pitch angle offset signal may be added to a default pitch angle signal provided by a default turbine pitch angle controller. In particular, the pitch angle offset signal may simply be added to the default pitch angle signal.

In particular, the method may further comprise rotating the rotor at which the rotor blade is mounted.

According to an embodiment, the method for controlling a rotor frequency further comprises disabling the adjusting the pitch angle of the rotor blade mounted at the rotor utilizing the pitch angle offset signal while the motion quantity is indicative of a rotation of the rotor at the nominal rotor frequency or above the nominal rotor frequency. In particular, when the rotational frequency of the generator or the rotor is at the nominal rotor frequency but if the electrical power output by the wind turbine is below the nominal power the rotational speed may be controlled by controlling a torque or a power of the generator by setting an appropriate reference signal to the generator and/or to the converter. In this region of operational conditions the adjustment of the pitch angle according to the pitch angle offset signal determined as described above may not be required.

In particular, when the rotor is rotated at (or temporarily slightly above or below) the nominal frequency, a conventional blade pitch control method may be applied for maintaining the rotor speed at the nominal speed. However, this conventional blade pitch control method is not adapted for avoiding a particular frequency of the rotor which coincides with a resonance frequency of the turbine.

In particular, if the rotational frequency of the generator or the rotor is at (or close to) the nominal rotational frequency and if also the power output from the turbine is at the nominal power the pitch angle may be increased for increasing wind speed according to a conventional control method, wherein the pitch angle increases for increasing wind speed such as to maintain the rotor (or generator) frequency at the nominal rotor (or generator) frequency and also to maintain the power at the nominal power. In particular, for these operational conditions, the generator frequency may be well above the critical rotational frequency such that an excitation of an oscillation mode of the turbine or of the turbine tower may not occur.

According to an embodiment, the method further comprises disabling the adjusting the pitch angle of the rotor blade during start-up (such as at rotational frequency of the generator below e.g. 500 RPM) of the rotation of the rotor (or the generator). In particular, during start-up it may be desirable not to include the pitch signal offset to not introduce unnecessary pitch activity or pitch oscillations. Enabling the speed avoidance pitch signal or pitch angle offset signal may be done gradually for example by slowly ramping/scaling it from zero offset to the final offset.

It should be understood that features (individually or in any combination) disclosed, described, explained, used for or employed or mentioned for a method for determining a pitch angle offset signal or for a method for controlling a rotor frequency of a rotor of a wind turbine may also be applied to, used for or employed for a system for determining a pitch angle offset signal or for a system for controlling a rotor frequency of a rotor of a wind turbine.

According to an embodiment a system for determining a pitch angle offset signal for controlling a rotor frequency of a rotor of a wind turbine is provided, wherein the system comprises an input terminal for obtaining a motion quantity indicative of a motion of the rotor; a processing module for determining a pitch angle offset signal based on the obtained motion quantity; and an output terminal at which the pitch angle offset signal is applied to be used for adjusting a blade pitch angle of a rotor blade mounted at the rotor for controlling the rotor frequency in order to reduce a time span during which the rotor is in a critical motion region.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings to which the invention is not limited.

FIG. 5 illustrates graphs of various parameters of the turbine for a nominal operation of a wind turbine for controlling the rotational speed and power output as function of the wind speed . . . according to an embodiment; and FIG. 6 illustrates graphs for showing the performance of a method for rotational speed avoidance control using pitch actuation according to an embodiment.

DETAILED DESCRIPTION

Figure 1:
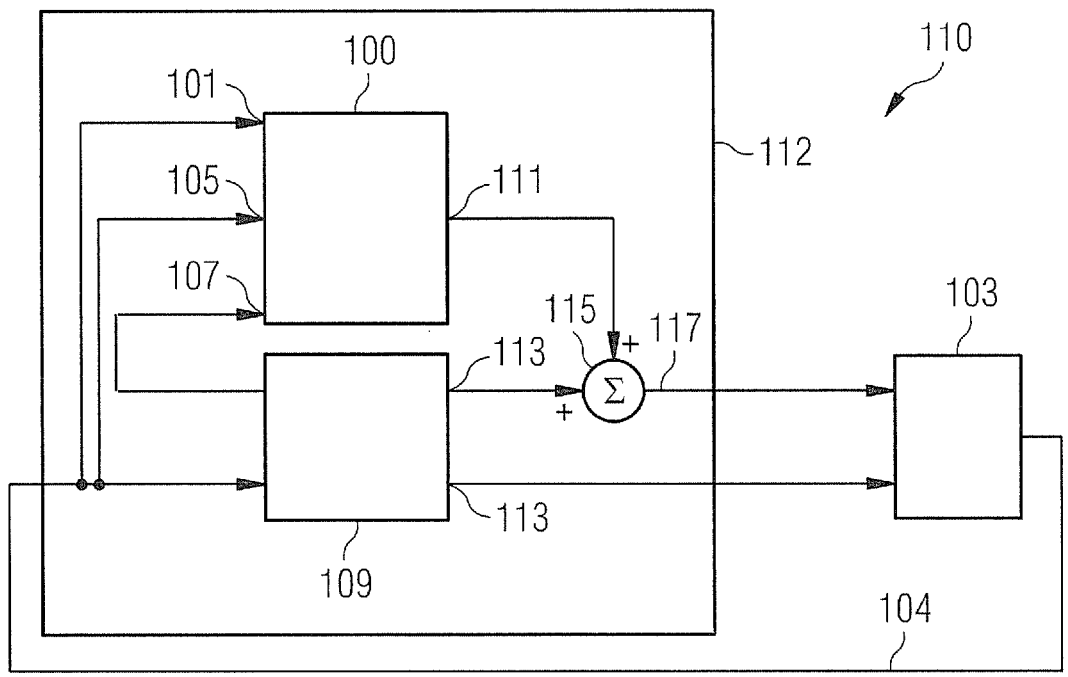
FIG. 1 schematically illustrates a system for controlling a rotor frequency of a rotor of a wind turbine comprising a system for determining a pitch angle offset signal according to an embodiment.

The illustration(s) in the drawings are in schematic form. It is noted that in different figures, similar or identical elements are provided with the same reference signs or with reference signs, which are different from the corresponding reference signs only within the first digit.

FIG. 1 illustrates in a schematic form a wind turbine 110 comprising a system 100 for determining a pitch angle offset signal according to an embodiment. In particular, the system 100 (also referred to as system for speed avoidance control 100 may be used in situations, where the generator torque or generator power can not be used for speed avoidance control.

FIG. 5 illustrates a first graph, a second graph, a third graph, and a fourth graph illustrating operational parameters of the wind turbine in dependence of the wind speed which is indicated in a respective abscissa axis. The wind speed indicated at the abscissa may be separated or grouped into a first region 540, a second region 542, a third region 543, and a fourth region 544. There might also be a (not illustrated) fifth region at higher rotational speeds where power production is reduced or stopped not to load the turbine too much in high winds.

Controlling the wind turbine may be different in the four regions 540, 542, 543, and 544. In particular, in the first region 540, the generator of the wind turbine does not produce energy (the power indicated in the third graph is zero) such that the generator of the wind turbine can not be used to control the rotor speed of the wind turbine by providing an appropriate generator torque.

In the second region 542 the wind speed is large enough such that power production starts when the generator speed is above a predetermined threshold rotor or generator frequency 545 indicated in the first graph in FIG. 5. The method for determining a pitch angle offset signal and the method for controlling a rotor frequency of a rotor of a wind turbine according to an embodiment may be performed in particular in the first region 540 and also in the second region 542 depending in which region the generator speed (see first graph in FIG. 5) matches a critical resonance frequency of an oscillation mode of the wind turbine, in particular an oscillation mode of the wind turbine tower.

According to an embodiment, the rotor blade pitch angle is controlled using the method for determining a pitch angle offset signal in the hedged region 546 (in the second graph of FIG. 5) covering the first region 540 and the second region 542, wherein the pitch angle is varied within a range between 0° and 10°, according to an exemplary pitch angle range. In other embodiments the pitch angle may be varied in a larger or in a smaller range.

For an increasing wind speed the generator speed or generator frequency will reach the nominal generator frequency or generator speed 547 which may denote a nominal generator speed, a rated generator speed, a nominal generator frequency or a rated generator frequency. The rotational speed is typically limited to reduce loads and acoustic noise emissions.

The third region 543 may be defined as a region, where the generator frequency is at the nominal generator frequency 547 but the output power (see third diagram in FIG. 5) is below the rated output power 548, wherein actually the speed may be controlled using the power (or torque), i.e. the power reference or torque reference may be set according to the speed error.

Regarding these regions it should be pointed out that not all turbines need necessarily be controlled according to these control regions. Thus, the provided description is representative for a typical operation of a wind turbine to which the invention is not limited. E.g. according to a particular operation region three may be excluded or control may be performed in a different way.

According to an embodiment, the method for determining a pitch angle offset signal and/or the method for controlling a rotor frequency of a rotor of a wind turbine is performed in the hedged region 546, i.e. for the case that the generator frequency is below the nominal generator frequency 547 and wherein in particular the generator frequency is below the predetermined threshold frequency 545.

Thus the method for determining the pitch angle offset signal and the method for controlling the rotor frequency of the rotor is in particular applied at low wind speed operation (region 540 and/or region 542 in FIG. 5), where the wind turbine is awaiting sufficient wind to cut-in, thus to produce energy. In particular, in the first region 540 in FIG. 5 the converter of the wind turbine is not available for controlling the rotor speed. Typically, the cut-in speed is higher than the cut-out speed (for example the cut-in speed may be between 800 RPM and 900 RPM and the cut-out speed may amount to around 600 RPM), making the turbine operate using hysteresis to avoid excessive cut-in and cut-out events.

As it is seen from FIG. 5, second diagram, the turbine typically operates using a fixed pitch angle in region 542 and 543 which is chosen such that it maximizes the efficiency of the aerodynamics. Typically, the pitch angle may be fixed within this region or changed a few degrees.

According to an embodiment, a pitch angle offset signal or pitch angle offset is added to this value to make it possible to control the rotor speed without requiring a controller that will track a certain speed reference or using the generator torque or generator power for control. Thereby the adjusted blade pitch angle may lie in the hatched region 546.

Again referring to FIG. 1 the speed avoidance system 100 (or resonance speed avoider) comprises an input terminal 101 for obtaining a rotational speed of the generator of the wind turbine or a rotational speed of the rotor of the wind turbine 103. Furthermore, the speed avoidance system 100 comprises another input terminal 105 for obtaining further measurement signals or operational parameters and still a further input terminal 107 for obtaining operational parameters from the conventional controller 109 which usually controls the pitch angle of the rotor blade. In particular, the rotational frequency or rotational speed of the generator or the rotor of the wind turbine 103 is obtained by measuring the rotational speed or rotational frequency.

Based on the rotational frequency of the generator or of the rotor of the wind turbine 103 the speed avoidance system 100 determines a pitch angle offset signal and supplies this signal at the output terminal 111. The pitch angle offset signal is added to a default pitch angle signal provided at an output 113 of the conventional controller 109 using an adder 115 to derive a total pitch angle signal (blade pitch reference) at a control line 117.

The total pitch angle signal is supplied to the wind turbine 103 which comprises an actuator to turn the blade according to the total pitch angle signal such as to adjust the blade pitch angle of the blade for controlling the rotor frequency of the rotor of the wind turbine. Typically, each blade has an actuator and there is typically multiple (three) blades mounted at the rotor. According to an embodiment, a wind turbine controller 112 comprising the speed avoidance system 100 and the conventional controller 109 is provided, wherein the wind turbine controller 112 generates the total pitch angle signal at the control line 117 based on measurement signals 104 (measurement vector) obtained from the wind turbine 103.

Figure 2:
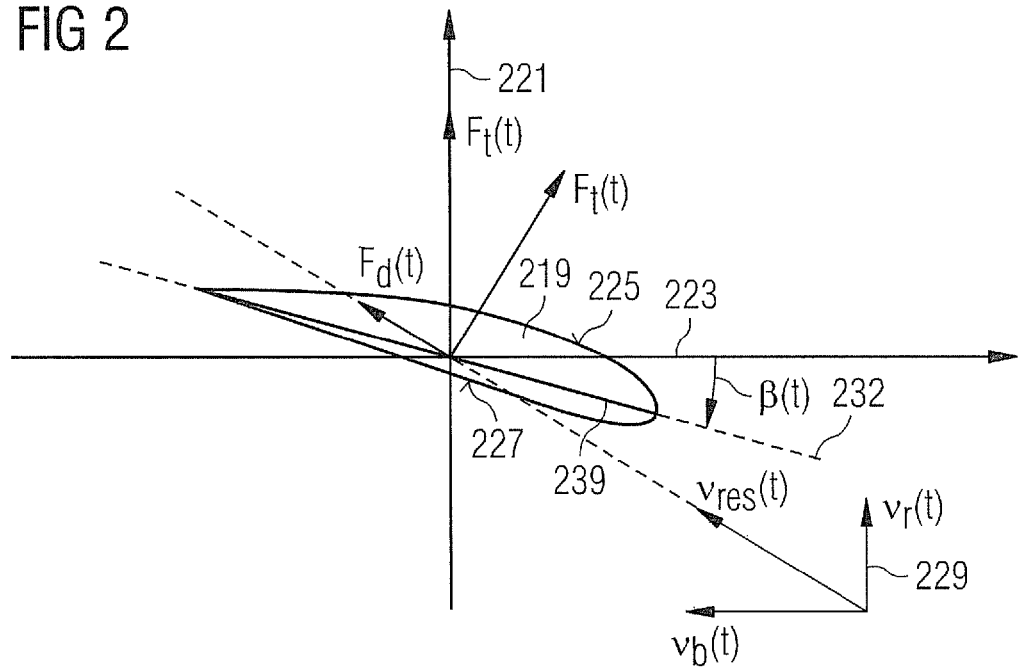
FIG. 2 illustrates a cross-sectional view of a rotor blade when viewed along a longitudinal axis of the blade which rotor blade may be controlled according to a method for controlling a rotor frequency of a rotor of a wind turbine according to an embodiment.

FIG. 2 illustrates schematically a cross-sectional view (airfoil) of a rotor blade 219 as viewed along a longitudinal axis of the rotor blade 219. The vertical axis 221 represents the rotor axis of the rotor and the horizontal axis 223 lies within the plane of rotation in which the rotor blade 219 rotates.

The rotor blade 219 comprises an upper surface 225 and a lower surface 227, wherein the lower surface 227 faces the wind propagating in a wind direction 229. A so-called chord line 239 is definable representing the straight line connecting the leading and trailing edges of the blade airfoil. The chord line 231 lies in a plane 232. An angle β between the rotation plane 223 and the chord plane 232 defines the blade pitch angle of the rotor blade 219. When the chord plane 232 coincides with the plane of rotation 223 the blade pitch angle is zero, when the chord plane 232 rotates clockwise the blade pitch angle increases from zero to positive values. In particular, increasing pitch angle results in pitching towards feather, while decreasing pitch angle results in pitching towards stall.

Figure 3:
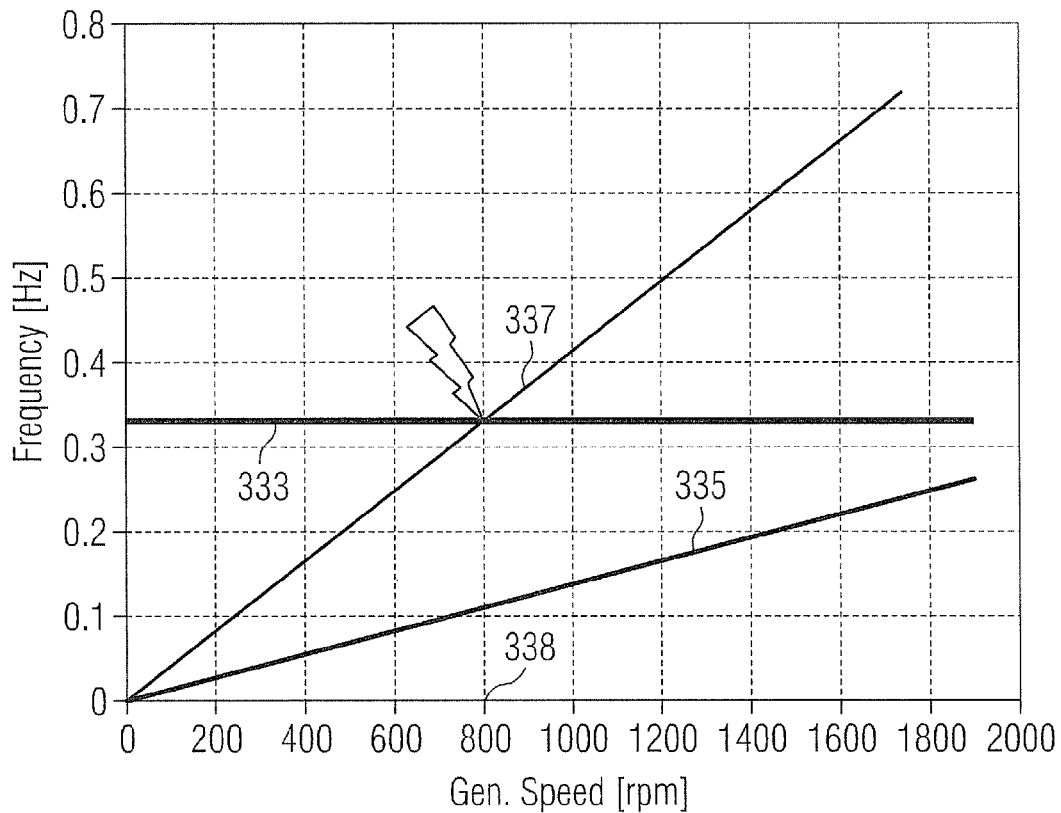
FIG. 3 illustrates a graph illustrating a generator speed and a resonance oscillation frequency.

FIG. 3 illustrates a graph, wherein on an abscissa the generator rotational speed is indicated, while on the ordinate a rotor frequency in Hz is indicated. Thereby, a horizontal line 333 denotes a fixed resonance frequency of a tower oscillation of the turbine, the curve or line 335 indicates the rotational frequency corresponding to the generator speed measured in RPM and the curve 337 denotes the rotational frequency of three times the generator speed measured in RPM. At a critical rotational frequency 338 (in this example at 800 RPM) of the generator the curve 337 intersects the horizontal line 333 indicating that the resonance frequency of the wind turbine tower (curve 333) equals three times the rotational frequency of the rotor (in this example caused by the existence of 3 blades).

According to an embodiment, a time span during which these two frequencies are equal or matched is reduced by performing a method for controlling a rotor frequency of a rotor of a wind turbine by adjusting the pitch angle of the rotor blade such as to quickly ride through the critical frequency (critical interval).

Figure 4:
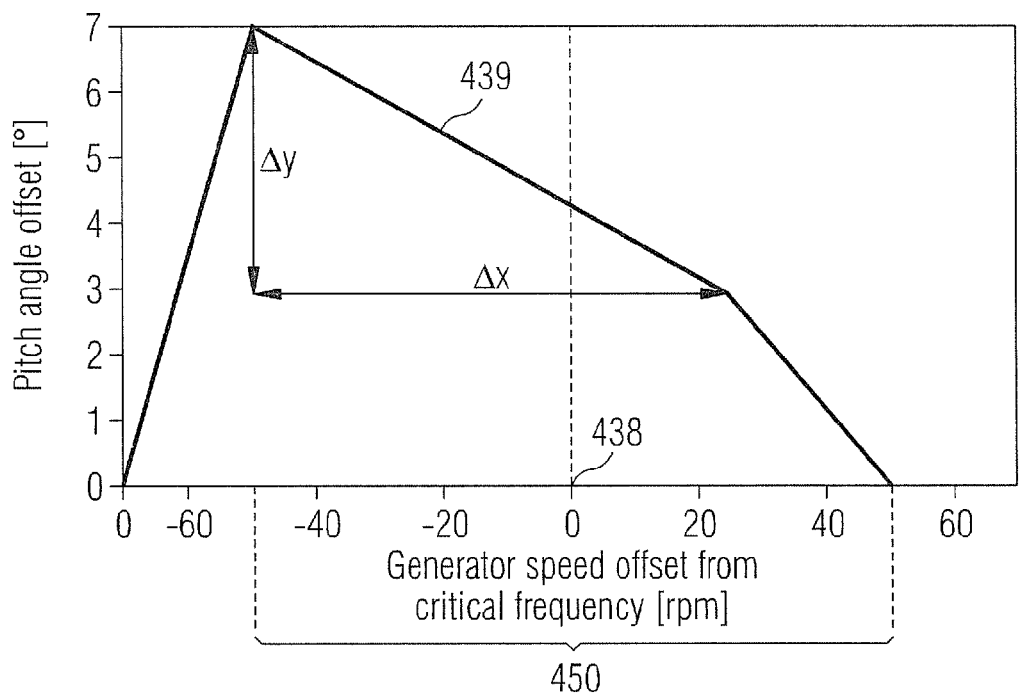
FIG. 4 illustrates a graph of a course of a pitch angle offset signal employed in a method for determining a pitch angle offset signal according to an embodiment.

FIG. 4 illustrates a graph showing on its abscissa the generator speed or frequency offset or speed offset from the critical frequency 338 illustrated in FIG. 3 and showing on its ordinate a pitch angle offset derived from a pitch angle offset signal determined according to an embodiment. At the value 0 at the abscissa the generator speed or generator frequency equals the critical frequency 338 as illustrated in FIG. 3, here labeled by reference sign 438. The pitch angle offset (curve 439) is larger than 0 in a range from −70 RPM to +50 RPM away from the critical frequency of the resonance. In a region from −70 RPM to −50 RPM around the critical frequency 438 the pitch angle offset 439 steeply increases to reach a value of 7° at −50 RPM away from the critical rotational frequency. In the critical region 450 ranging from −50 RPM to +50 RPM centered at the critical rotational frequency the pitch angle offset 439 decreases having a negative slope. In particular, the pitch angle offset first decreases in a linear fashion from −50 RPM to around +25 RPM with a first negative slope and then decreases from about +25 RPM to +50 RPM in a linear manner with a second negative slope, wherein the second negative slope is steeper than the first negative slope. However, this is just one example. The pitch offset curve may have one slope or may have a changing slope in some or in all points.

By decreasing the pitch angle offset in the critical region 450 acceleration or deceleration of the rotor is facilitated to quickly ride through the critical rotational frequency. In particular, if reading left-to-right in the figure (increasing rotational speeds) the rotor is accelerated in the critical region. Otherwise it will decelerate. Thereby loads on components of the wind turbine may be reduced. Adding a pitch angle offset to a default pitch angle signal makes it possible to control the rotor speed without requiring a controller that will track a certain speed reference or using the generator torque or generator power for speed avoidance control. In particular, the pitch angle offset 439 may be supplied to the output terminal 111 of the speed avoidance system 100 illustrated in FIG. 1.

It may be optional that the signal supplied to the output terminal 111 may also depend on additional parameters or variables. According to an embodiment the pitch angle offset signal is a function of the generator speed or the rotor speed. In particular, the pitch angle offset signal 439 supplied to the output terminal 111 (FIG. 1) is designed such that it keeps the speed away from the critical speed or critical frequency by changing the pitch angle. The negative slope of the pitch angle offset signal 439 (see FIG. 4) in the critical region 450 (a bound around the critical speed) makes the generator speed ride fast through the critical speed assuming that the pitch offset is added to a pitch angle reference equal or larger than the pitch angle maximizing the aerodynamic efficiency (also denoted the optimum pitch angle).

In general, the pitch angle offset signal or the pitch signal should have a negative slope in the critical region 450 (which is an interval around the critical speed or critical frequency). The shape of the signal 439 may vary. In order to have the negative slope in the critical region 450, the pitch angle offset signal needs to be ramped up from zero offset with a certain slope (e.g. for generator speed offsets between −70 RPM to −50 RPM). The exact shape of the speed avoidance pitch signal (also referred to as pitch angle offset signal) may depend on operational parameters such as air density and/or wind speed.

Further, the speed avoidance pitch signal or pitch angle offset signal may be enabled (momentarily) as a function of turbine state or other signals such as acceleration measurements. An application of a turbine state could be disabling the pitch signal offset, if the turbine is in a start-up state, where it might be desirable not to include the pitch signal offset to avoid introducing unnecessary pitch activity. Enabling the speed avoidance pitch signal or pitch angle offset signal (curve) may be done gradually for example by slowing ramping/scaling it from zero offset (curve) to the final offset (curve). FIG. 6 illustrates two graphs of simulations of application of the method for speed avoidance control using pitch actuation or controlling the rotor speed according to an embodiment. The first graph in FIG. 6 illustrates on its abscissa the generator speed and on its ordinate the occurrence of the corresponding generator speed. Thereby, the bars labelled by reference sign 650 indicate the occurrences when the control of the rotational speed using the pitch angle offset signal is enabled, while the bars labelled by reference sign 652 indicate the occurrences, when the speed avoidance function is disabled. As can be seen, when the speed avoidance function is enabled the occurrences of a critical generator speed (here at around 600 RPM) can be reduced.

The second graph in FIG. 6 illustrates on its abscissa the time and on its ordinate the generator speed. Thereby, the curve labelled by reference sign 654 indicates the generator speed when the speed avoidance function is enabled, while the curve labelled with reference sign 656 indicates the generator speed, when the speed avoidance function is disabled. As can be seen from the second graph of FIG. 6, the curve 654 lies below the critical generator speed, i.e. 600 RPM, for a longer time span than the curve 656. Thus, adding the pitch angle offset signal to the default pitch angle signal is an efficient way of avoiding the critical frequency of 600 RPM.

In particular, the method of controlling a rotor frequency may reduce loads of the wind turbine which makes speed avoidance an important feature.

Furthermore, some logic to change the speed reference (which will be set point for a controller controlling the pitch angle) can alternatively be used to avoid a critical frequency.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for determining a pitch angle offset signal for controlling a rotor frequency of a rotor of a wind turbine, the method comprising:
   obtaining a motion quantity indicative of a motion of the rotor;
   determining the pitch angle offset signal based on the motion quantity; determining the pitch angle offset signal based on the motion quantity such that the pitch angle offset signal is adapted to be used for adjusting a blade pitch angle; and
   adjusting, via pitch angle offset signal, the a blade pitch angle of a rotor blade mounted at the rotor for controlling the rotor frequency in order to reduce a time span the rotor spends in a critical motion region
   wherein the motion quantity is indicative of rotational frequency of the rotor, and wherein the critical motion region is a critical range of the rotational frequency of the rotor.

2. The method according to claim 1, wherein the critical range is a range around a predetermined or estimated critical rotational frequency of the rotor.

3. The method according to claim 2, wherein the predetermined or estimated critical rotational frequency comprises a frequency equal to a fraction or equal to an integer multiple of a resonance oscillation frequency of an oscillation mode of the turbine, in particular of a tower of the turbine.

4. The method according to claim 2, wherein when the motion quantity is indicative of a rotational frequency the pitch angle offset signal is generated such that the adjusted rotor blade pitch angle is greater when the rotational frequency is lower than the predetermined critical rotational frequency than when the rotational frequency is greater than the predetermined critical rotational frequency.

5. The method according to claim 2, wherein the pitch angle offset signal is generated such that the adjusted rotor blade pitch angle decreases in the critical motion region in at least a portion of the critical motion region, along increasing rotational frequency of the rotor.

6. The method according to claim 2, wherein determining the pitch angle offset signal is based on the motion quantity and on the critical motion region, wherein in particular determining the critical motion region is based on the critical rotational frequency.

7. The method according to claim 1, wherein the determining the pitch angle offset signal occurs while the motion quantity is indicative of a rotation of the rotor below a nominal rotor frequency.

8. The method according to claim 1, further comprising: wherein the determining the pitch angle offset signal occurs while the motion quantity is indicative of a rotation of the rotor below a predetermined threshold rotor frequency lower than the nominal rotor frequency, and wherein below the threshold rotor frequency the turbine supplies zero electric power to a utility grid.

9. The method according claim 1, wherein the determining the pitch angle offset signal is further based on one or more operational parameters selected from the group consisting of a wind speed, an air density, an acceleration signal of the rotor, an acceleration signal of a generator, and a controller state.

10. The method according to claim 1, further comprising: disabling the adjusting the pitch angle of the rotor blade mounted at the rotor based on the pitch angle offset signal while the motion quantity is indicative of a rotation of the rotor at the nominal rotor frequency or above the nominal rotor frequency.

11. The method according to claim 1, further comprising: disabling the adjusting the pitch angle of the rotor blade during start-up of the rotation of the rotor.

12. A system for determining a pitch angle offset signal for controlling a rotor frequency of a rotor of a wind turbine, the system comprising:
an input terminal for obtaining a motion quantity indicative of a motion of the rotor;
a processing module for determining a pitch angle offset signal based on the obtained motion quantity; and
an output terminal at which the pitch angle offset signal is applied to adjust a blade pitch angle of a rotor blade mounted at the rotor for controlling the rotor frequency in order to reduce a time span the rotor spends in a critical motion region,
wherein the motion quantity is indicative of rotational frequency of the rotor, and
wherein the critical motion region is a critical range of the rotational frequency of the rotor.

\* \* \* \* \*